Aug. 4, 1959 — G. M. KAUTZ — 2,898,052
FEEDER CONSTRUCTION
Filed Aug. 31, 1955 — 4 Sheets-Sheet 1

INVENTOR.
George M. Kautz
BY
Thiess, Olsen, Mecklenburger,
von Holst, & Coltman

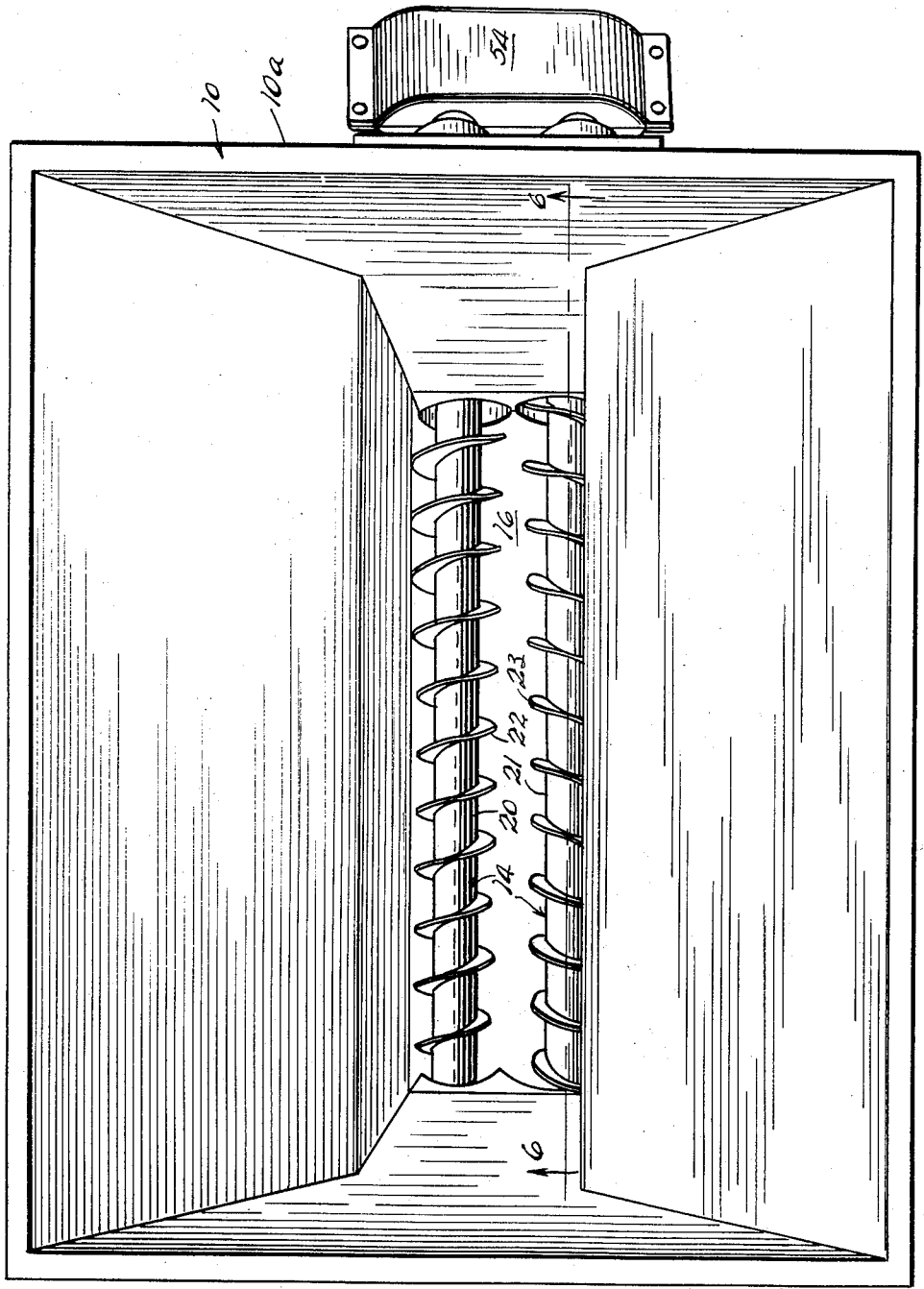

Aug. 4, 1959　　　　　G. M. KAUTZ　　　　　2,898,052
FEEDER CONSTRUCTION
Filed Aug. 31, 1955　　　　　　　　　　4 Sheets-Sheet 3
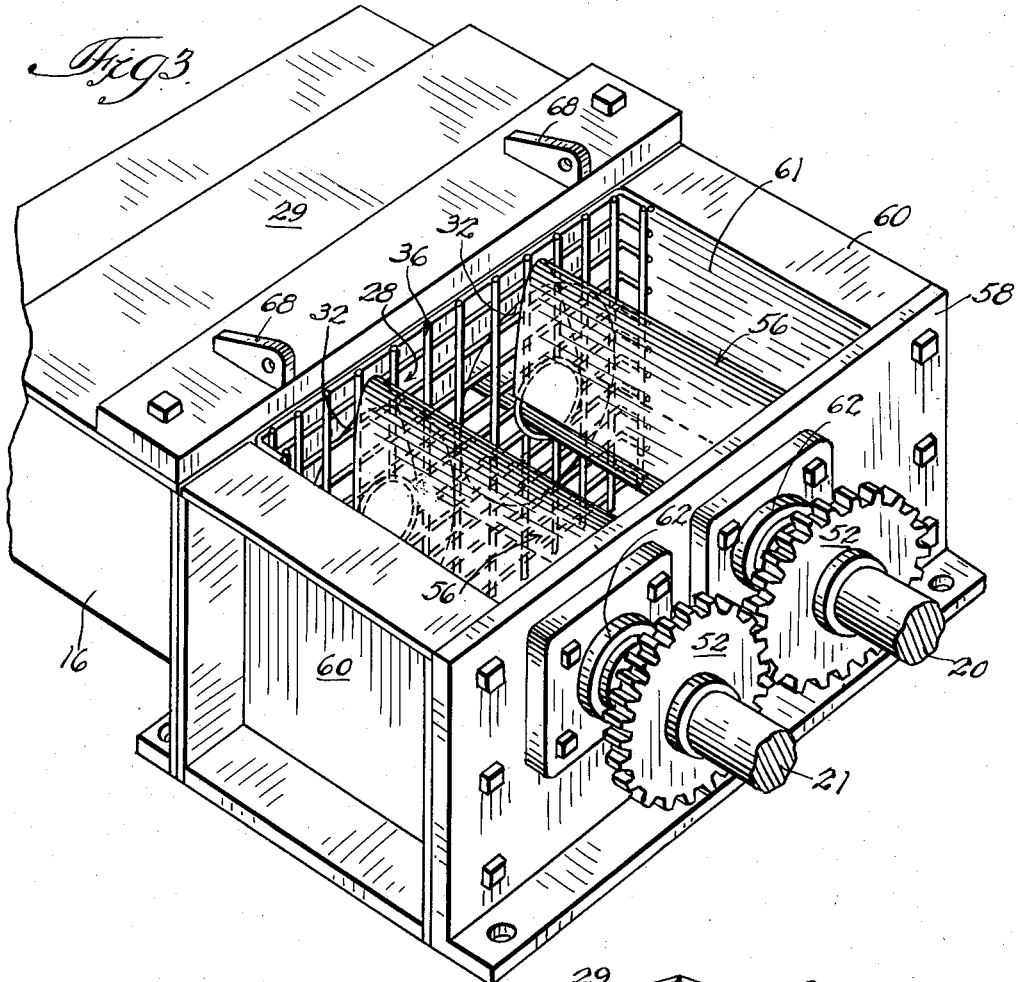
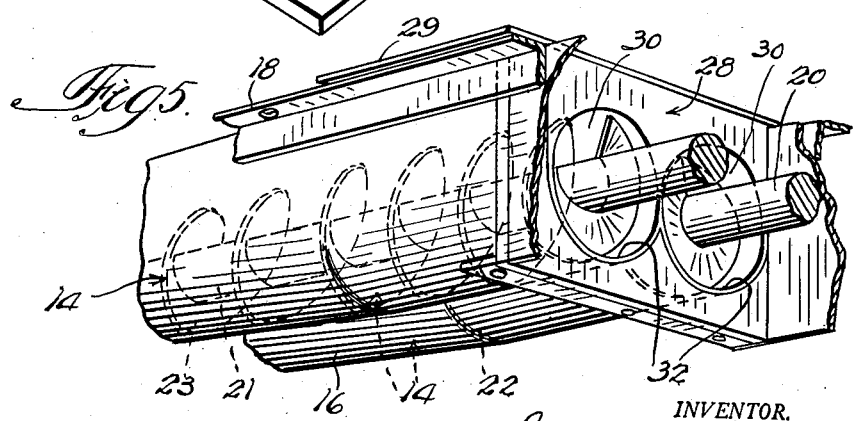
INVENTOR.
George M. Kautz
BY Thiess, Olson, Mecklenburger,
van Holst, & Coltman.
Attys.

Aug. 4, 1959 G. M. KAUTZ 2,898,052
FEEDER CONSTRUCTION
Filed Aug. 31, 1955 4 Sheets-Sheet 4
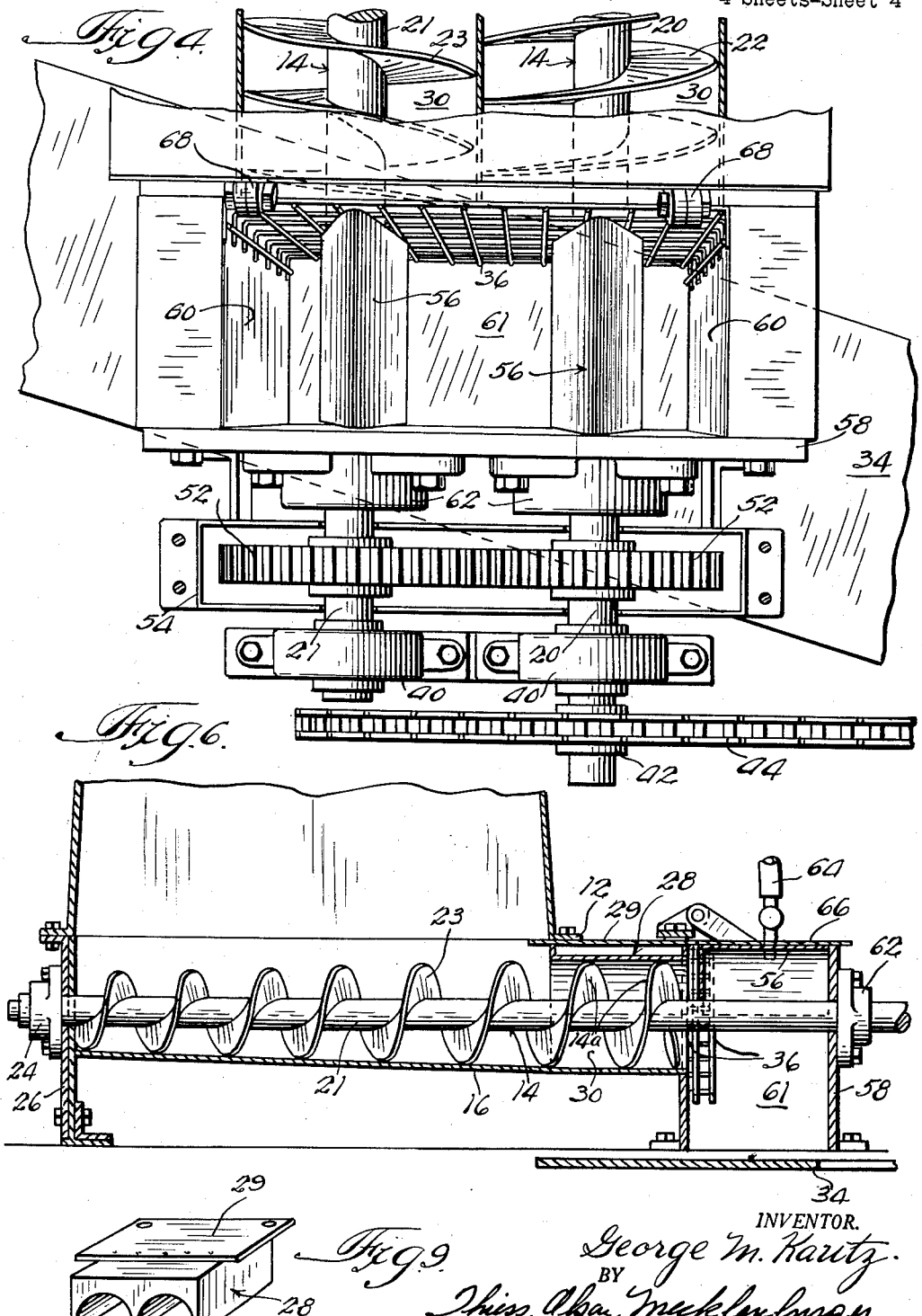
INVENTOR.
George M. Kautz.
BY
Thiess, Olson, Mecklenburger,
von Holst, & Coltman. Attys.

United States Patent Office 2,898,052
Patented Aug. 4, 1959

2,898,052

FEEDER CONSTRUCTION

George M. Kautz, Danville, Ill., assignor to Lauhoff Grain Company, Danville, Ill., a corporation of Illinois Application August 31, 1955, Serial No. 531,765

2 Claims. (Cl. 241—84)

The present invention relates to an improved feeder construction which is adapted to continuously supply uniform streams of comminuted materials.

The continuous feeding of consistently uniform streams of finely divided materials, such as flour, resin size, chemicals, or the like, in a continuous process is extremely difficult. Individual particles of such materials have a tendency to form irregular coherent masses or lumps because of their minute size and resulting ability to readily compact and thus emerge from the discharge opening of known feeder constructions in a nonuniform stream of irregular masses.

The tendency of such materials which have variable angles of repose and which readily form compact masses has long presented a difficult problem in the continuous feeding of comminuted materials to working apparatus such as is employed in the paper manufacturing industry or in the gypsum industry in the making of wallboard. Upon passage of such materials through a feeder opening, they drop at irregular intervals in nonuniform masses thereby producing a nonuniform resulting board composition.

To insure the desired minimum quantity of comminuted materials throughout the wallboard construction, the heretofore employed feeder apparatus must feed materials at a rate greater than would be necessary if a uniform feed were possible. Such an expedient results in tremendous waste of materials over a period of time, in addition to resulting products of nonuniform composition.

It is to be understood that the feeder construction hereinafter to be disclosed is not limited in use to dry comminuted materials, but may also be employed with any material of substantially uniform composition having flow characteristics similar to comminuted materials and which has an inherent tendency to form readily decomposable coherent lumps or masses.

It is an object, therefore, of this invention to provide an improved feeder apparatus adapted to continuously feed a uniform stream of comminuted material at desired rates.

It is another object of this invention to provide an improved barrier means over a feed outlet which readily reduces the emerging feed to a uniform stream.

It is a further object of this invention to provide a novel feeder bin construction which obviates compacting of the material in the course of feeding the same, thereby eliminating the need for vibrators, agitators, etc.

It is another object of this invention to provide a novel tapered conveyor screw construction whereby the material level in a storage bin or hopper recedes gradually, obviating localized "holing" and subsequent compaction of the feed material in the bin.

It is a further object of this invention to provide a novel feeder attachment which protects the feeder mechanism and feed material particles by the maintenance of a desired atmosphere over the feeder discharge opening.

It is a still further object of this invention to provide a feeder construction which may handle and feed deliquescent materials with ease and efficiency.

It is another object of this invention to provide a feeder construction which may be readily and accurately calibrated so as to supply quantities of comminuted materials at desired rates to a continuous process.

The above and other objects will become more apparent from the description, accompanying drawings and appended claims.

In carrying out the invention in one form, an apparatus for feeding readily compacted comminuted materials or the like is provided. The feeder comprises a bin or hopper member for holding material to be fed. The bin has a lower portion formed in the configuration of a frustrum of a pyramid, thereby enabling the feed contained therein to descend into larger and larger areas without compaction of the same in the course of the feeding operation. A tapered trough is disposed beneath the bin and houses at least one, and preferably two, screw conveyor members having tapered helical blades disposed about parallel central shafts. The tapered nature of the blades enables feed disposed above the trough in the bin to be evenly withdrawn therefrom and descend uniformly without compaction. The discharging end portion of each screw has a blade portion of uniform diameter which is housed in an encompassing chamber defined by the trough bottom and an overlying shroud. The end limits of the trough and overlying shroud define outlet orifices through which the comminuted material is continuously forced by the screw conveyors. Disposed over the outlet orifices are screen members which function to break any lumps or masses of the emerging comminuted material into a feed stream of a substantially uniform nature. Consequently a desired continuously uniform stream of particles emerges from the feeder discharging opening.

In a modification of the above apparatus, a cover may be disposed over the feed bin after filling of the same to prevent free access of the surrounding atmosphere. The feeder apparatus may then feed materials which are preferably kept out of contact with gases of the atmosphere, such as deliquescent materials, without lumping or hardening of the same because of absorption of water vapor or other gases of the atmosphere. The cover, nevertheless, allows air to bleed into the bin so as to avoid creation of a vacuum as the level of the material to be fed recedes.

In a second modification of the provided apparatus, an atmosphere may be disposed about the outlet orifices for purposes of preventing contact of the emerging feed with steam vapors or other undesirable vapors which may be present adjacent the apparatus outlet. The means for providing such an atmosphere may comprise a perforated pipe through which air or other desirable gases may flow. The pipe may be attached to a cover member of an open bottom discharge chamber disposed about said outlet orifices.

For a more complete understanding of the invention reference should now be had to the drawings wherein:

Fig. 2 is a top plan view on an enlarged scale of the feeder illustrated in Fig. 1;

Fig. 3 is a fragmentary perspective view showing in detail the discharge openings of the feeder apparatus;

Fig. 4 is a fragmentary top plan view, partly in section, illustrating an end portion of the feeder;

Fig. 5 is a fragmentary perspective view illustrating the end portions of the conveyor screws and the discharge orifices in the provided feeder apparatus;

Fig. 6 is a fragmentary sectional view taken on line 6—6 of Fig. 2;

Fig. 9 is a perspective view of a chamber forming shroud member employed in the illustrated feeder.

Figures 1, 7, 8:
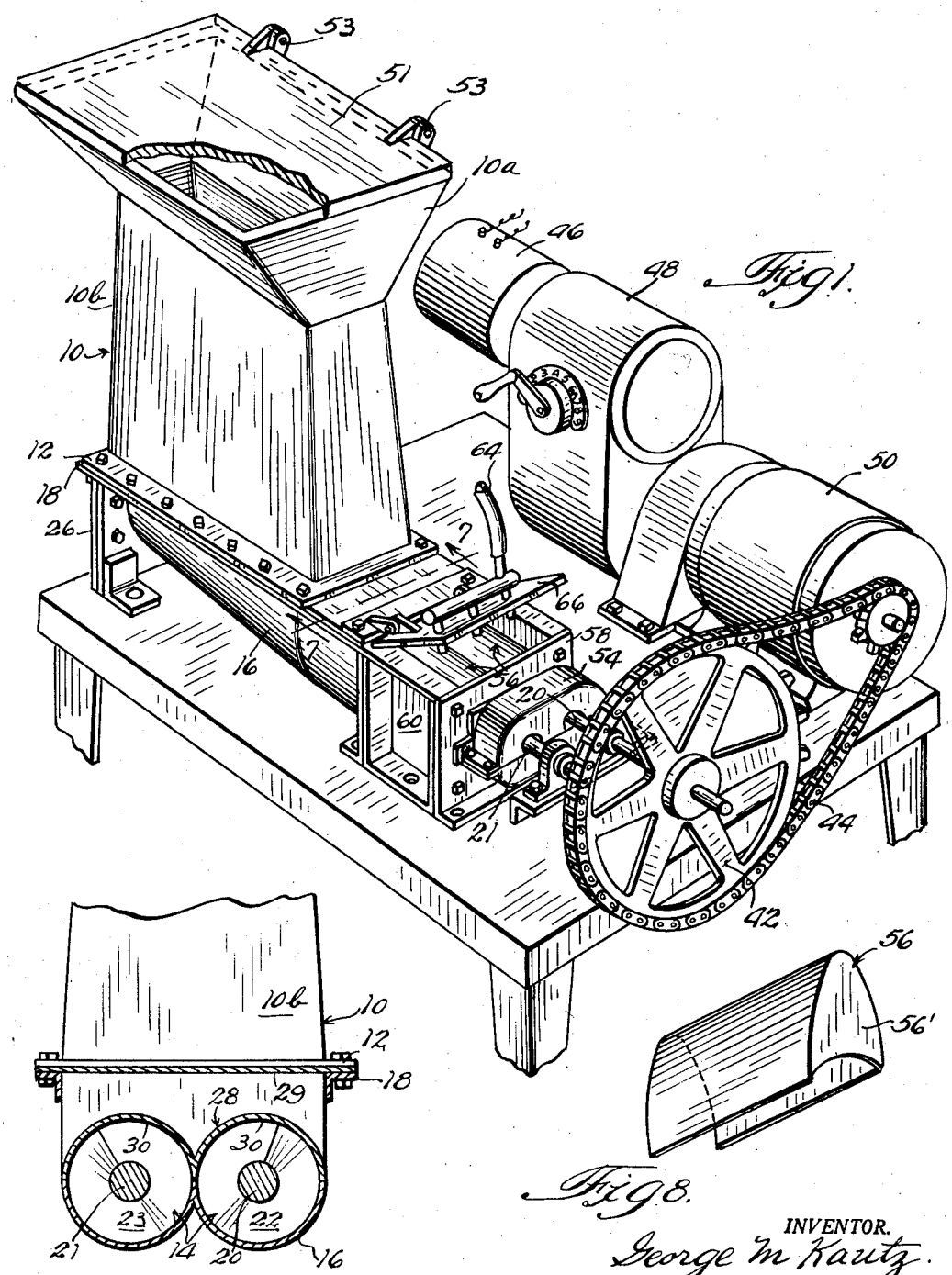
Figure 1 is a perspective view of a feeder constructed in accordance with the invention.
Fig. 7 is a fragmentary sectional view, partly in elevation, taken on line 7—7 of Fig. 1.
Fig. 8 is a perspective view of a shaft cover member which is employed in the illustrated feeder.

For a more complete understanding of the invention, reference should now be had to the drawings, and more particularly to Fig. 1, wherein a provided feeder embodying the inventive concepts hereafter disclosed is illustrated. The feeder comprises a bin 10 having a peripheral flanged portion 12 formed integrally with the lower end limit thereof. The bin 10 is divided into two portions 10a and 10b. The upper portion 10a is fabricated so as to assume the configuration of an inverted frustrum of a pyramid—that is, the four walls slope inwardly so as to assume a funnel configuration which facilitates loading of the bin. Formed integrally with the upper portion 10a is a lower bin portion 10b, the sides of which are arranged in the configuration of an upright frustrum of a pyramid. Comminuted material which is to be fed in a continuous manner by the illustrated feeder is deposited in the bin 10 through the opening in the upper bin portion 10a. As the material in the hopper is withdrawn therefrom by means of an underlying conveyor hereinafter to be described, the level of the feed material in the hopper drops, but in so doing does not become compacted. The avoidance of compaction is made possible by the outwardly sloping nature of the sides of the bottom portion 10b of the hopper member 10. As the comminuted material level in the hopper recedes, greater bin volume is available for reception of the overlying feed. Such being the case, it is obvious that compaction of the receding feed is obviated, and the need for a vibrator, or other equivalent means which forces feed disposed in the bin to drop, is eliminated.

As has been above mentioned, the feed disposed in the bin 10 is withdrawn therefrom by means of an underlying conveyor which delivers the comminuted material to a discharge opening. The conveyor comprises twin screw conveyors 14 disposed in a trough member 16 (see Figs. 1 and 2). The latter trough member has a flange portion 18 defining the upper periphery thereof, which is bolted or otherwise suitably affixed along the longitudinal edges thereof to the bottom flange portion 12 of the bin 10. The screw conveyors 14 comprise parallel central shafts 20 and 21 about which are disposed helical blades 22 and 23. As will be seen in Fig. 6, the shafts are journaled at one end limit in the bearing members 24, which are bolted or otherwise fixedly secured to a feeder reinforcing plate 26. It will also be noted in Figs. 2 and 6 that the helical blade disposed about the central shaft of each screw conveyor is tapered so that the blade flights increase in size from left to right as illustrated, whereby the bite or quantity of comminuted material engaged by each convolution or flight of the blades 22 and 23 increases as the size of the helical blade increases.

The tapering of the helical blades in the screw conveyors provided comprises one of the features of the submitted apparatus. Referring to Fig. 2, it will be noted that the two screw conveyors 14 traverse the entire length of the bin 10. The screw conveyors rotate in opposite directions toward the adjacent bin wall and are staggered in the flights in such a way that there is no compaction or surging of the feed material. In the course of rotation, the material engaged by the flight or convolution of least diameter (that is, the flight disposed at the left end limit of the screw conveyor as illustrated in Fig. 2) will proceed along the length of the bin as it passes from flight to flight. However, since each successive flight is capable of engaging a greater quantity of comminuted material than the flight to its immediate left, an additional quantity of overlying comminuted material in addition to that passed on from the flight to the left, will be engaged by each convolution of the screw conveyor and longitudinally moved to the right of the bin. It is thus apparent that the comminuted material disposed over the screw conveyors will thus recede across the entire bin width at a uniform rate. The taper of a helical blade for use with a bin of given size should be such as to effect even recession of the feed level in the bin in the normal course of feeder operation. Because of the outwardly sloping nature of the bin walls above mentioned, no compaction of the comminuted material will occur as the material level in the bin recedes.

It will be noted from Figs. 1 and 7 that the trough 16 is also possessed of a tapered configuration, and, in addition, is so formed as to define a casing resembling in general the solids of revolution generated by the rotating screw conveyors 14.

Referring to Fig. 6, it is seen that tapering of each screw conveyor ceases as it passes from beneath the bin; thus the last two convolutions or flights 14a of the screw conveyor 14 illustrated in Fig. 6 are of approximately the same size. Once having passed from beneath the overlying comminuted material in bin 10, the positioning of increasing larger flights on the screw conveyors would result in inefficiency of operation.

It will also be noted from Fig. 6 that a shroud member 28, shown in perspective in Fig. 9, encases the top portion of both screw conveyor members. The shroud 28 has a securing plate 29 affixed thereto for purposes of bolting or otherwise securing the same to the edges of the trough 16. Referring to the sectional views illustrated in Figs. 6 and 7, it is seen that the end portion of each screw conveyor 14 is disposed in a closed chamber 30 defined in its upper portion by the shroud 28 and defined in its lower portion by the trough 16 against which the shroud 28 abuts.

As each screw conveyor 14 longitudinally moves the comminuted material disposed in the bin 10, the material transported must of necessity traverse the closed chamber 30. It is apparent that the screw conveyors 14 continually maintain the chambers 30 in a packed condition. The end limit of each of the chambers 30 defines a discharge opening or orifice 32, more clearly shown in Figs. 3 and 5, through which the feed material is forced to pass. It is thus seen that in the normal course of operation, material is deposited in the hopper or bin 10 and longitudinally conveyed by means of the tapered screw conveyors 14 to a discharge opening 32 through which the comminuted material is forced in a continuous manner onto an underlying conveyor 34 or other collection means.

As has been previously mentioned, it is an object of this invention to provide a feeder which produces continuous streams of comminuted material which are uniform in nature. Comminuted materials, such as flour, chemicals, resin size, etc., because of their pulverulent nature and fine particle size are readily compacted and have an inherent tendency to form coherent masses. Therefore, if the discharge openings were unobstructed, as illustrated in Fig. 5, the comminuted material having this tendency to form coherent masses or lumps would drop in an irregular manner from the end limits of the helical blades 22 and 23.

However, if a barrier means, such as a mesh or foraminous screenlike member 36 illustrated in Fig. 3, is disposed over the outlet orifices 32, the comminuted material which has a tendency to form lumps or masses (which lumps and masses are readily disintegrated) must of necessity be broken down and reduced in size, thereby forming a substantially uniform stream in the course of traversing the barrier means. It is intended that the term "barrier means" include within its scope any equivalent means which readily reduces the size of the readily breakable or easily crumbled masses emerging through the outlet orifices 32. It is obvious that as the foramina in the barrier become finer, the emerging feed stream tends to become more uniform. Although a foraminous screen-like member has been illustrated, it is obvious, for example, that a member having a plurality of slots through which the comminuted material may readily flow would work to equal advantage.

In the course of traversing the foraminous screen 36, the comminuted material is prevented from feeding back into the trough 16 because of the shroud chambers 30 which are filled to capacity with the comminuted material. The end limits of the flights of the screw conveyors are also cut flush with the discharge openings 32, as shown in Fig. 5, to prevent carrying back of feed material.

Thus when the screw conveyors 14 are regulated so as to rotate at desired speeds which are maintained constant, a uniform stream of comminuted material will be withdrawn from the apparatus bin 10. Knowing the rate at which the comminuted material is withdrawn from the bin, the value of such an apparatus in a continuous commercial process is apparent.

The motive means which rotatably drive the screw conveyors 14 engages the end portions of the shafts disposed exteriorly of the trough 16.

Thus, it will be noted from Fig. 4 that the shafts 20 and 21 of screw conveyors 14 project across the foraminous barrier 36 and are journaled at their end limits in fixedly positioned pillow blocks 40. The end limit of shaft 20 has keyed thereto a sprocket wheel 42, more clearly shown in Fig. 1. The sprocket wheel 42 is rotatably driven by chain 44, which is in turn rotatably driven by a motive means such as motor 46, through a regulatable speed reducing means 48 and a constant speed reducing means 50, all of which are illustrated in Fig. 1. The rotational movement of the shaft 20 rotatably driven by sprocket wheel 42 is transmitted to the parallel coaxial shaft 21 by means of spur gears 52 which are keyed to the end portion of each shaft. A gear guard 54 is disposed over the latter spur gear members for purposes of gear protection and safety.

Because of the projection of the shafts 20 and 21 beyond the outlet orifices, other means must be provided adjacent the outlet orifices 32 to prevent the emerging stream of comminuted material from building up on shaft portions disposed exteriorly of the trough and adjacent the orifice openings. Should such build-ups occur, periodic dumping of irregular masses of comminuted material on the underlying conveyors would occur impairing the uniformity of the emerging feed stream. The means for obviating such build-up comprises the shaft cover members 56, one of which is illustrated in Fig. 8. Each of the cover members is welded or otherwise suitably affixed to a supporting member such as end plate 58 (see Fig. 4). By disposing such cover members over the rotating shafts and adjacent the outlet orifices 32, the comminuted material which is continually broken down into a stream of substantially uniform size by the screen 36 abuts against solid faces 56' of covers 56 and immediately drops to the underlying conveyor 34 or other receptacle. The covers 56 eliminate all shaft surfaces on which the comminuted material may collect. Utilizing such cover members assures uniform discharging streams of the comminuted material.

It will be seen from Figs. 3 and 4 that the end portions of the shafts 20 and 21 traverse the end plate 58 which is securely affixed to plates 60, which are in turn fixedly attached to the end limit of the trough member 16 by means of attached flange portions. Affixed to the end plate 58 are two bearing members 62 which engage the traversing screw conveyor shafts.

It will be seen from Fig. 3 that the discharge portion of the feeder apparatus, in combination with the plate members 60 and end plate 58, describe a discharge chute 61 into which the material emerging from the outlet orifices is discharged.

It may be desirable under certain conditions of operation to surround the discharge orifices of the feeder apparatus with a desired atmosphere; for instance, in those installations in which the feeder apparatus is disposed over rising steam vapors. By surrounding the outlet orifices 32 with an atmosphere of flowing air or other desired gas which prevents the entrance of steam or other vapors into the discharge chute defined by the end wall 58 and the side walls 60, contamination of the discharging comminuted material while in the chute 61 is obviated. For instance, steam rising from below may combine with the material being fed from the discharge opening, thickening or expanding the same, causing sticking of the moving screw conveyors or other operational failure. In addition, the discharging comminuted material may become gummy and sticky adhering to chute walls and drop in irregular masses to the underlying conveyor belt 34, thereby destroying the uniform rate of material discharge. To provide a protective surrounding atmosphere, a valved air supply pipe or inlet 64, illustrated in Fig. 9, may traverse a cover member 66 which is disposed at the top of the discharge chute and which pivotally engages brackets 68, clearly shown in Fig. 3. When the cover is in the closed position, as illustrated in Fig. 6, air is allowed to enter through the inlet 64; the outlet orifices are continually surrounded by a protective atmosphere and, because of the positive pressure existing in the discharge chute, any rising vapor is prevented from entering the same as the air or other gas continually flows out the chute open bottom.

It may also be desirable, in those instances in which a deliquescent or hygroscopic comminuted material or other material from which it is desired to exclude gases of the atmosphere is being fed in a continuous process, to provide a cover member such as cover 51 illustrated in Fig. 1 for the filling opening in bin 10. By utilizing such a cover member, which is hinged to bin portion 10a at 53, the moisture in the atmosphere is prevented from combining with the feed material, and the latter feed material is enabled to freely recede in the bin without absorbing any appreciable amount of atmospheric moisture. Some air, however, is allowed to seep in between the cover-bin interface in order to prevent the creation of a vacuum in the bin. Since air is prevented from entering the bin through the outlet orifices, because of the seal which the emerging material itself provides, it is obvious that unappreciable quantities of water are absorbed by deliquescent materials utilizing the provided apparatus.

The ready adaptability of the provided feeder in a continuous manufacturing process is obvious. For instance, if a predetermined rate of feed of a comminuted material is desirable in a proposed process, the rotational speed of the screw conveyors 14 which will deliver the desired rate of feed may be readily arrived at as follows: The material to be fed is placed in the bin and the screw conveyor is regulated by the speed reducing members 48 and 50 so as to rotate at the rate of one revolution per minute. The material emerging from the outlet orifices 32 is collected over a selected period of time and weighed or measured. The weight of feed delivered per single revolution being readily calculated from the above data, the desired speed of rotation of the screw conveyors to feed a predetermined quantity of material per unit time is readily arrived at.

It is thus seen that a feeder apparatus has been provided which assures uniformity of feed despite any inherent nature of the comminuted material being fed to compact or form coherent masses or lumps. The provided apparatus is so constructed as to eliminate the need for either vibrators or other equivalent means. The submitted feeder apparatus is readily adaptable for use with materials requiring special handling and may be employed in a continuous process after a simple calibration. The consistency which the disclosed apparatus effects in the course of feeding uniform streams of materials to a process operation enables great savings in materials to be had. The ready adaptability of the disclosed apparatus to change and modification having been made apparent from the above, it is intended that the inventive concept herein disclosed be limited only by the scope of the appended claims.

I claim:

1. In an apparatus for feeding comminuted material and the like at uniform rates through an outlet orifice, the combination comprising a bin for holding such material to be fed, said bin having a plurality of outwardly sloping sides forming a frustrum of a pyramid, at least one screw conveyor means disposed along the length of and beneath the bottom of said bin, said screw conveyor means comprising a tapered helical blade disposed about and affixed to a shaft, the length of said shaft exceeding the length of said bin whereby an end portion thereof is located exteriorly of the bin, motive means in communication with the exteriorly positioned end portion of said shaft for rotatably driving the same, a shroud member surrounding the end portion of said shaft blade, said shroud defining in part an orifice through which said comminuted materials are forced, barrier means disposed across said orifice whereby masses of said comminuted materials are broken down upon emerging from said orifice, and cover means disposed over said exteriorly positioned shaft portion for preventing build-up of comminuted materials emerging from said orifice thereon.

2. In an apparatus for feeding comminuted material and the like at uniform rates through an outlet orifice, the combination comprising means for storing said comminuted material, means for conveying such comminuted material from said storing means to said outlet orifice, means for housing a portion of said conveying means in which a first end portion of said conveying means is disposed for coacting with said housing means and uniformly compacting the comminuted material conveyed by said conveying means first end portion, barrier means having a plurality of openings therein disposed across the first end portion of said conveying means and engaging the comminuted material forced therethrough by the conveying means whereby said comminuted material is continuously discharged in a stream of uniform particles, a second end portion of said conveying means joined to said first portion disposed exteriorly of said housing means, and means disposed over said conveyor means second end portion for preventing the buildup of discharged comminuted material thereon.

References Cited in the file of this patent

UNITED STATES PATENTS

| | | |
|---|---|---|
| 216,958 | Hudson | July 1, 1879 |
| 1,092,780 | Lyle | Apr. 7, 1914 |
| 1,379,306 | Lower | May 24, 1921 |
| 1,425,519 | Ford | Aug. 15, 1922 |
| 1,575,717 | Plauson | Mar. 9, 1926 |
| 1,825,475 | Pfeiffer | Sept. 29, 1931 |
| 1,867,573 | Leach | July 19, 1932 |
| 1,931,181 | Culver | Oct. 17, 1933 |
| 1,951,427 | Lodge | Mar. 20, 1934 |
| 1,980,898 | Abernethy | Nov. 13, 1934 |
| 2,011,055 | Klugh | Aug. 13, 1935 |
| 2,215,435 | Hale | Sept. 17, 1940 |
| 2,242,587 | Martin | May 20, 1941 |
| 2,621,083 | Daniels | Dec. 9, 1952 |
| 2,656,123 | Smith | Oct. 20, 1953 |
| 2,685,825 | Novak | Aug. 10, 1954 |

FOREIGN PATENTS

| | | |
|---|---|---|
| 705,070 | Great Britain | Mar. 10, 1954 |